United States Patent
Tasaki et al.

[11] Patent Number: 5,316,710
[45] Date of Patent: May 31, 1994

[54] PROCESS FOR PRODUCING CERAMIC HONEYCOMB STRUCTURAL BODIES

[75] Inventors: Yuji Tasaki, Nagoya; Yukihisa Wada, Aichi, both of Japan

[73] Assignee: NGK Insulators, Ltd., Japan

[21] Appl. No.: 947,468

[22] Filed: Sep. 21, 1992

[30] Foreign Application Priority Data

Sep. 30, 1991 [JP] Japan ................................. 3-251658

[51] Int. Cl.$^5$ ............................................. C04B 33/32
[52] U.S. Cl. ........................................ 264/57; 264/58; 432/258
[58] Field of Search ................... 264/57, 58; 432/258, 432/259

[56] References Cited

U.S. PATENT DOCUMENTS

| | | | |
|---|---|---|---|
| 3,899,326 | 8/1975 | Frost | 264/57 |
| 3,904,352 | 9/1975 | Thurnauer | 264/58 |
| 4,715,812 | 12/1987 | von Matuschka | 264/57 |
| 4,717,812 | 12/1987 | von Matuschka et al. | 219/528 |
| 4,786,542 | 11/1988 | Yasuda | 428/116 |
| 5,149,264 | 9/1992 | Horikawa | 432/258 |

FOREIGN PATENT DOCUMENTS

| | | |
|---|---|---|
| 0200894 | 11/1986 | European Pat. Off. . |
| 0232621 | 8/1987 | European Pat. Off. . |
| 63-113294 | 5/1988 | Japan ................................. 432/258 |
| 1-54636 | 11/1989 | Japan . |
| 2-199067 | 8/1990 | Japan . |
| 1576312 | 10/1980 | United Kingdom ................ 432/258 |

OTHER PUBLICATIONS

The Condensed Chemical Dictionary, Reinhold Pub. Corp. New York, 1961, p. 769.
Derwent Publication AN 86-342508.

Primary Examiner—James Derrington
Attorney, Agent, or Firm—Parkhurst, Wendel & Rossi

[57] ABSTRACT

A process for producing a ceramic honeycomb structural body, comprises the steps of placing a green ceramic honeycomb structural body on a ceramic plate, and then firing the green ceramic honeycomb structural body. The green ceramic honeycomb structural body is placed on the ceramic plate in the state that a cell-opened end face contacts the ceramic plate. The ceramic plate is composed mainly of heat-resistive inorganic fibers, and has a bulk density of not less than 1.00 g/cm$^3$.

3 Claims, 3 Drawing Sheets

FIG_1
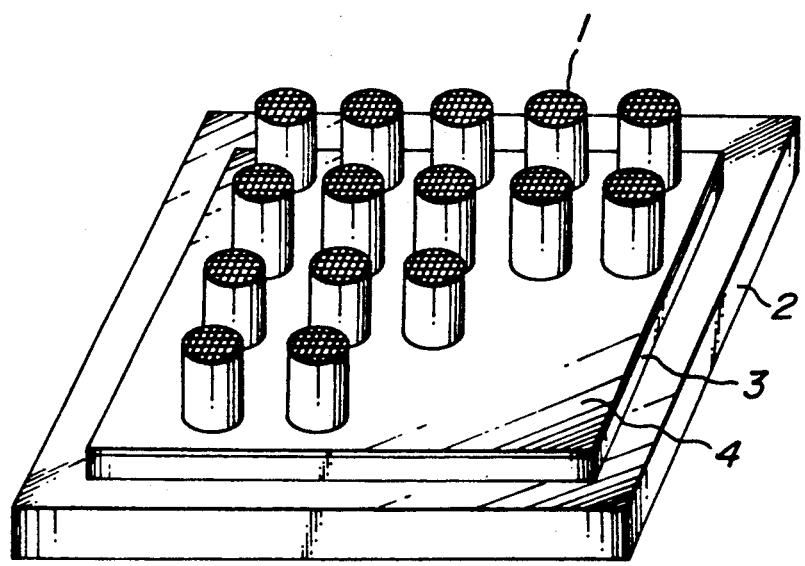

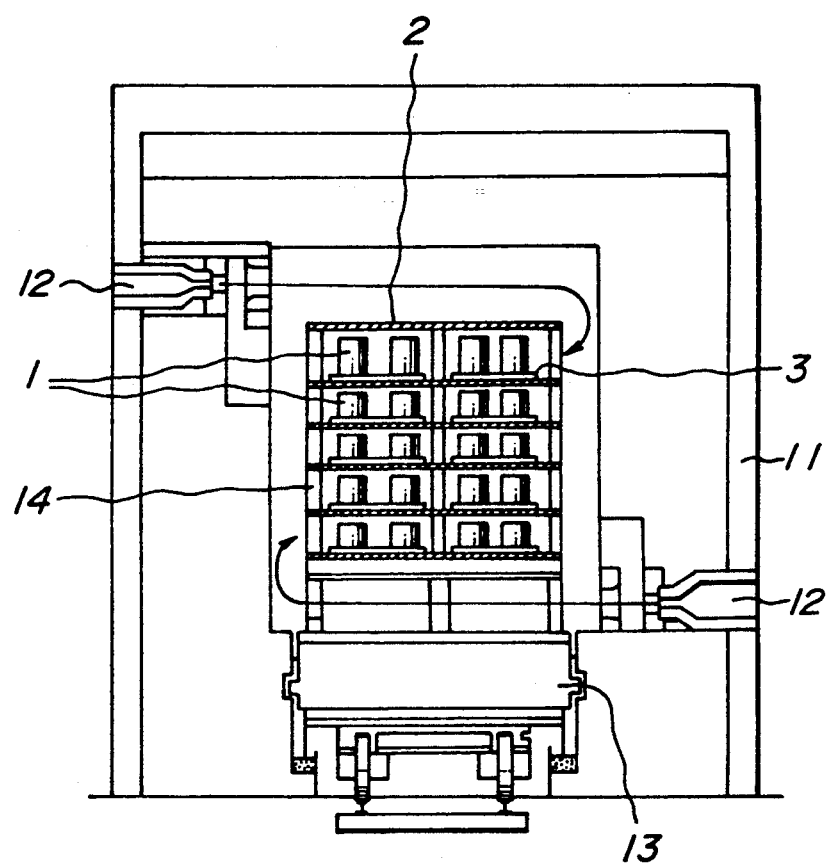
FIG_2

FIG_3a
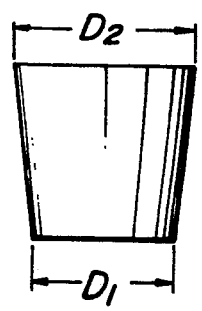
FIG_3b
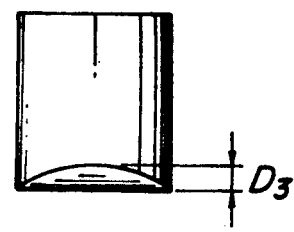
FIG_4
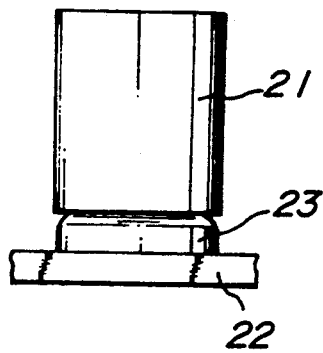

PROCESS FOR PRODUCING CERAMIC HONEYCOMB STRUCTURAL BODIES

BACKGROUND OF THE INVENTION (1) Field of the Invention

The present invention relates to a process for producing ceramic honeycomb structural bodies. More particularly, the invention relates to the ceramic honeycomb structural body-producing process including an improved firing step.

(2) Related Art Statement

Heretofore, it has been common practice to fire extruded green ceramic honeycomb structural bodies by passing the honeycomb structural bodies through a tunnel kiln, wherein the honeycomb bodies are placed on a shelf plate of a truck, while cell-opened end surfaces contact the shelf plate. In order to improve this firing process, examined Japanese patent publication No. 1-54,636 discloses a process for firing green ceramic honeycomb structural bodies 21 in the state that a setter 23 is placed between the honeycomb structural body 21 and a shelf plate 22 as shown in FIG. 4. This setter is a ceramic plate having a honeycomb structure with an upper edge being chamfered. Japanese patent application Laid-open No. 2-199,067 discloses a process for firing green ceramic honeycomb structural bodies in the state that an alumina base solid plate is placed between the honeycomb structural body and the shelf plate.

However, the process using the setters as disclosed in examined Japanese patent publication No. 1-54,636 has the following problems:

(i) With increase in the number of times of passing the setter through the tunnel kiln, the setter is largely deformed (warped) by heat, or the surface of the setter becomes coarse due to fusing-out of the silica contained in the setter. As a result, the lower end face of the honeycomb structural body is deformed, or ribs are deformed or cracked.

(ii) The service life of the setter is short, i.e., the number of times of passing the setter through the tunnel kiln is as small as 35 to 40 due to the above problems.

(iii) Difference in dimension between upper and lower portions of the product is great due to difference in temperature between them.

On the other hand, the process using the alumina base plate as disclosed in the above unexamined Japanese patent application Laid-open No. 2-199,067 has the following problems:

(i) With increase in the number of times of passing the alumina base plate through the tunnel kiln, the base plate is warped or deformed due to the thermal deformation of the shelf plate, when the alumina base plate is thin. As a result, the lower end face of the honeycomb structural body is deformed or cracked.

(ii) When the alumina base plate is thick, the weight per unit area is increased which increases heat capacity.

(iii) The lower end face of the honeycomb structural body changes color by reacting with the alumina base plate. It is believed that the lower end face of the honeycomb structural body changes color since the composition of cordierite constituting the honeycomb structural body at the lower end face slightly changes due to the reaction between the alumina base plate and the cordierite during firing.

SUMMARY OF THE INVENTION

It is an object of the present invention to solve the above-mentioned problems, and to provide a process for producing ceramic honeycomb structural bodies, which process can reduce twisting of ribs, deformation of an end face and incidental cracking of the end face in a honeycomb structural body due to thermal deformation of its firing table. Other objects include prolongation of the service life of the firing table, reduction of the difference in dimension between upper and lower portions of the honeycomb structural body, and prevention of color change of the lower end face of the honeycomb structural body due to reaction between the firing table and the lower end face of the honeycomb structural body.

The process for producing ceramic honeycomb structural body according to the present invention comprises the step of placing a green ceramic honeycomb structural body on a ceramic plate composed mainly of heat-resistive inorganic fibers and having a bulk density of not less than 1.00 g/cm$^3$, and firing the green ceramic honeycomb structural body on the ceramic plate. It is preferable to fire the honeycomb structural body in the state that the honeycomb structural body is placed on the ceramic plate having a coating layer formed on a surface of the ceramic plate, the coating layer being made of either one of mullite and cordierite. In addition, it is preferably that the bulk density of the ceramic plate is not less than 1.00 g/cm$^3$ but not more than 2.5 g/cm$^3$. If the bulk density is more than 2.5 g/cm$^3$, the ceramic plate is too heavy to easily handle. However, the upper limit of the bulk density of 2.5 g/cm$^3$ is not necessarily restrictive in the present invention. Further, it is preferable that the heat-resistive inorganic fibers are made of 55 to 95 wt % of Al$_2$O$_3$ and 5 to 45 wt % of SiO$_2$.

In the above construction, the green ceramic honeycomb structural body is fired in a state that the ceramic plate is placed between the green ceramic honeycomb structural body and the shelf plate. Therefore, as is clear from examples mentioned later, twisting of the ribs, deformation of the end face and incidental cracking of the end face in the honeycomb structural body can be reduced. The reason why the bulk density is not less than 1.00 g/cm$^3$ is that as is seen from the examples mentioned later, if the bulk density is less than 1.00 g/cm$^3$, the honeycomb structural body is clogged. Further, it was discovered that when the green ceramic honeycomb structural body is fired on the ceramic plate having the coating layer made of either one of mullite and cordierite formed on the surface thereof, color change of the lower end face of the honeycomb structural body by reacting with the ceramic plate is prevented. The heat-resistive inorganic fibers are preferably made of 55-95 wt % of Al$_2$O$_3$ and 5-45 wt % of SiO$_2$ from the standpoint of resistance to heat. Alumina and silica may exist in the form of mullite depending on their composition. In addition, ordinary additives such as inorganic filler and binder may be incorporated into the ceramic plate.

The producing process according to the present invention is substantially the same as those in the conventional processes except for the firing step.

BRIEF DESCRIPTION OF THE ATTACHED DRAWINGS

For a better understanding of the invention, reference is made to the attached drawings, wherein:

FIG. 1 is a view for illustrating an example of the process for producing the ceramic honeycomb structural body according to the present invention;

FIG. 2 is a view for schematically illustrating the state in which the ceramic honeycomb structural bodies are actually fired in a tunnel kiln according to the present invention;

FIG. 3(a) is a view for schematically illustrating difference in dimension between upper and lower portions of the honeycomb structural body in Experiments;

FIG. 3(b) is a view for schematically illustrating a depressed amount in a central portion of the honeycomb structural body in Experiments; and FIG. 4 is a view for schematically illustrating an example of the process for producing the ceramic honeycomb structural body according to the conventional process.

DETAILED DESCRIPTION OF THE INVENTION

FIG. 1 is a view for illustrating the process for producing the ceramic honeycomb structural body according to the present invention. As shown in FIG. 1, according to the present invention, a plurality of ceramic honeycomb structural bodies 1 shaped by extrusion are placed on a fiber board 3 as a ceramic plate on a shelf plate 2 such that cell-opened end faces of the honeycomb structural bodies contact the fiber board, and the ceramic honeycomb structural bodies are fired in this state. The fiber board 3 is composed mainly of heat-resistive inorganic fibers, and ordinary additives such as an inorganic filler and a binder may be incorporated therein besides the inorganic fibers. A coating layer 4 made of mullite or cordierite is formed on the surface of the fiber board 3 as shown in FIG. 1. In this case, color change of the lower end face of the honeycomb structural body can be effectively prevented. The coating layer 4 may be applied to the end face of the honeycomb structural body by brushing, spraying or flame spraying. This is discovered as follows. That is, when a cordierite-based honeycomb structural body was fired in the state that the structural body was placed on a fiber board composed mainly of silica-alumina, it occasionally happened that a face (a lower end face) of the structural body contacting the board was whitened. In order to prevent this phenomen, it is discovered that mullite and cordierite are suitable. It is considered that the above color change occurs due to the change in composition through reaction between the board and the honeycomb structural body.

The ceramic plate or fiber board 3 as an example of the ceramic plate made of the heat-resistive inorganic fibers used in the present invention has the following properties. Such a fiber board is commercially available, for example, from NICHIAS CORPORATION (Trade name: Fine Flex 18HD). Such fiber boards may be produced by an ordinary fiber board-producing process. For example, mixed fibers of alumina fibers and silica fibers are mixed with an organic binder and water to disperse the fibers therein. The resulting mixture is press molded and dewatered through a mesh. Then, a glass component and/or an oxide such as $B_2O_3$ is interporated into the molding, which is dried and fired to obtain a fiber board.

Chemical composition: $Al_2O_3$ 55 to 95 wt %, $SiO_2$ 5 to 45%

Heat resistance: not less than 1,400° C.

Bulk density d: $d \geq 1.0$ g/cm$^3$

Bending strength: not less than 40 kg/cm$^2$ (at room temperature)

Thickness t: $10 \leq t \leq 30$ (mm)

If the bulk density is less than 1.0 g/cm$^3$, as is clear from the examples mentioned below, the honeycomb structural body is clogged with the fibers. If the thickness is less than 10 mm, since the strength is small, it is likely that the honeycomb structural body is cracked and warped. Mullite and cordierite are suitable as the coating material for preventing the color change of the honeycomb structural body. The thickness of the coating layer is preferably in a range of 0.5 mm $\leq t_1 \leq$ 2.0 mm. If the thickness is more than 2.0 mm, it is likely that the coating layer will peel from the ceramic plate. If the thickness is less than 0.5 mm, it is likely that no effect will be obtained for the prevention of the color change. The thickness of the coating layer is preferably $0.6 \leq t_1 \leq 1.5$ mm.

FIG. 2 is a view for illustrating the state in which the ceramic honeycomb structural bodies are actually fired in the tunnel kiln as shown in FIG. 1. In FIG. 2, heating burners 12 are provided in a kiln wall 11 of the tunnel kiln, and a truck 13 moves through the tunnel kiln. Shelf plates 2 in the state shown in FIG. 1 are pile on the truck 13 through poles 14, and the honeycomb structural bodies are fired by passing the truck through the tunnel kiln.

Experiment 1

Fiber boards having dimensions, compositions and densities shown in Table 1 were used in Examples 1-6, and a conventional setter having the honeycomb structure was used in Comparative Example. Green ceramic honeycomb structural bodies having a diameter of 124 mm and a height of 20 cm were fired by passing them through the tunnel kiln as shown in FIG. 2. After the firing, twisting of ribs, depressed amounts of central portions, occurrence rates of cracks at the end faces, and differences in dimensions between the upper and lower portions were measured with respect to the fired products. Twisting of the ribs were visually judged. The difference in dimension was determined by calculating a difference in diameter, $D_1$-$D_2$, of the honeycomb structural body as shown in FIG. 3(a). The occurrence rate of the cracks at the end face was determined from the percentage of the cracked cases per the total cases. The depressed amount was determined from a depressed amount $D_3$ in the central portion of the lower end face of the honeycomb structural body as shown in FIG. 3(b). Results are also shown in Table 1.

TABLE 1

| Run No. | Example 1 | Example 2 | Example 3 | Example 4 | Comparative Example 1 | Comparative Example 2 | Comparative Example 3 (setter) |
|---|---|---|---|---|---|---|---|
| Dimensions (mm) | 300 × 300 × 10 | 300 × 300 × 10 | 300 × 300 × 10 | 450 × 450 × 20 | 300 × 300 × 10 | 450 × 450 × 10 | 124φ × 2 |
| Composition | | | | | | | |
| $Al_2O_3$ | 57 | 70 | 80 | 95 | 58 | 73 | — |
| $SiO_2$ | 43 | 30 | 20 | 5 | 42 | 27 | — |

TABLE 1-continued

| Run No. | Example 1 | Example 2 | Example 3 | Example 4 | Comparative Example 1 | Comparative Example 2 | Comparative Example 3 (setter) |
|---|---|---|---|---|---|---|---|
| Bulk density (g/cm$^3$) | 1.00 | 1.00 | 1.00 | 1.10 | 0.20 | 0.50 | — |
| Surface roughness ($\mu$m) | 14 | 20 | 25 | 12 | 50 | 45 | — |
| Difference between upper and lower sizes (mm) | 0.3 | 0.3 | 0.3 | 0.3 | 0.4 | 0.4 | 0.7 |
| Depressed amount in central portion (mm) | 0.2 | 0.2 | 0.2 | 0.2 | 0.3 | 0.2 | 0.5 |
| Cracking at end face (%) | 0.2 | 0.1 | 0.1 | 0.1 | 0.1 | 0.2 | 0.8 |
| Rib deformation | o | o | o | o | o | o | Δ |
| Clogging | o | o | o | o | x | x | o |

Surface roughness: center line average height (measured according to JIS B0601)

From the results in Table 1, it is seen Examples 1, 2, 3 and 4 were free from twisting of the ribs, and had smaller depressed amounts, smaller cracking rates at the end faces, and smaller dimension differences as compared with Comparative Examples 1 and 2 having the bulk density of less than 1.0 g/cm$^3$ and Comparative Example 3.

Experiment 2

Further, the fiber boards and plate and the setter shown in Table 1 as well as an alumina base plate were used, and some fiber boards (Examples 5 through 8) were each coated with a coating material at a given thickness as shown in Table 2, and the other fiber board was not coated as comparative example. The dimensional difference between the upper and lower portions, the depressed amount of the central portion, the cracking at the end face, the twisting of the ribs and clogging were measured in the same manner as in Experiment 1 with respect to the fired honeycomb structural bodies, and color change was examined. Results are shown in Table 2.

saying that the process according to the present invention may be applied to other kilns, such as a periodic kiln.

As is clear from the above explanation, according to the present invention, since the green ceramic honeycomb structural body is fired in the state that the ceramic plate composed mainly of the heat-resistive inorganic fibers is placed between the honeycomb structural body and the shelf plate, the twisting of the ribs and the deformation of the end face due to the thermal deformation of the ceramic plate as well as the incidental cracking of the end face in the honeycomb structural body can be reduced, and the ceramic honeycomb structural bodies having excellent properties can be obtained. Further, service life of the firing table can be prolonged as compared with the conventional setter. Furthermore, the dimensional difference between the upper and lower portions of the honeycomb structural body can be reduced. In addition, when the honeycomb structural body is fired on the fiber board on which the coating layer made of either one of mullite and cordierite is formed, change of color due to the reaction between the

TABLE 2

| Run No. | Example 5 | Example 6 | Example 7 | Example 8 | Comparative Example 4 | Comparative Example 5 | Comparative Example 6 |
|---|---|---|---|---|---|---|---|
| Run No., etc. in Table 1 | Example 3 | Example 4 | Example 6 | Example 6 | Example 6 | Alumina base plate | setter |
| Coating material | Mullite | Cordierite | Mullite | Cordierite | — | — | — |
| Coating thickness (mm) | 0.8 | 0.5 | 1.0 | 1.0 | — | — | — |
| Surface roughness (mm) | 30 | 25 | 20 | 25 | 12 | 0.5 | — |
| Difference between upper and lower sizes (mm) | 0.3 | 0.3 | 0.3 | 0.4 | 0.3 | 0.3 | 0.7 |
| Depressed amount in central portion (mm) | 0.2 | 0.2 | 0.2 | 0.3 | 0.2 | 0.2 | 0.5 |
| Cracking at end face (%) | 0.2 | 0.1 | 0.1 | 0.2 | 0.1 | 0.1 | 0.8 |
| Rib deformation | o | o | o | o | o | o | Δ |
| Clogging | o | o | o | o | o | o | o |
| Discoloration | o | o | o | o | x | x | o |

As is seen from Table 2, each of Examples 5 through 8 in which the surface of the fiber board was coated with the coating layer did not change the color, and thus the coating layer had an effect upon the color change.

The present invention is not limited to the above-mentioned examples, and various modifications, variations and changes are possible. For example, the honeycomb structural bodies are fired in the tunnel kiln in the above examples, but the process of the invention is not limited to the firing in the tunnel kiln. It goes without ceramic plate and the lower end face of the honeycomb structural body on firing can be prevented.

What is claimed is:

1. A process for producing a ceramic honeycomb structural body, comprising the steps of:
    placing a green ceramic honeycomb structural body on a ceramic plate in a state that a cell-open end face of the honeycomb structural body contacts the ceramic plate, said ceramic plate being composed mainly of heat-resistive inorganic fibers and having a bulk density of not less than 1.00 g/cm$^3$, the ceramic plate having one of a cordierite coating layer and mullite coating layer formed on a surface thereof; and firing the green ceramic honeycomb structural body.

2. The process of claim 1, wherein the heat-resistive inorganic fibers are composed mainly of 55 to 95 wt % of $Al_2O_3$ and 5 to 45 wt % of $SiO_2$.

3. A process for producing a ceramic honeycomb structural body, comprising the steps of:

placing a green ceramic honeycomb structural body on a ceramic plate in a state that a cell-open end face of the honeycomb structural body contacts the ceramic plate, said ceramic plate being composed mainly of heat-resistive inorganic fibers and having a bulk density of not less than 1.00 g/cm$^3$, the ceramic plate having a cordierite coating layer formed on a surface thereof; and firing the green ceramic honeycomb structural body.

* * * * *